May 9, 1944.   H. R. GROSS   2,348,292
AUTOMATIC LATCHING AND LOCKING DEVICE
Filed April 8, 1943
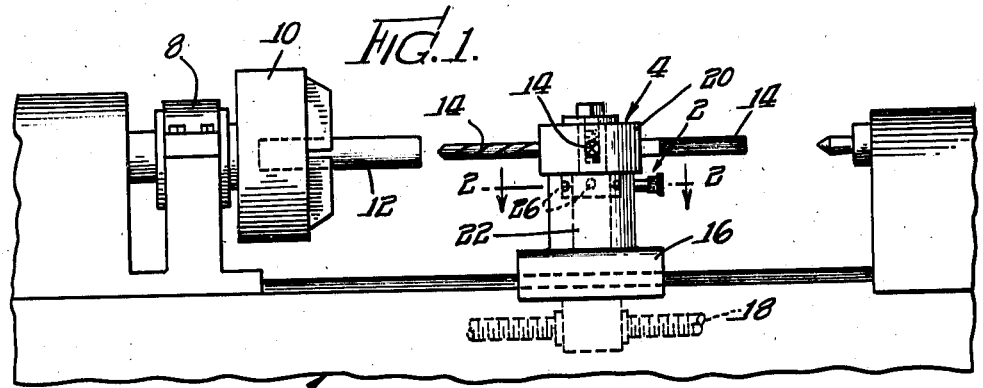
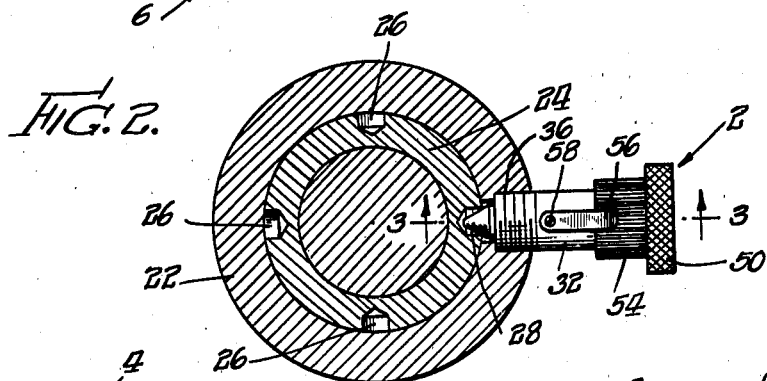
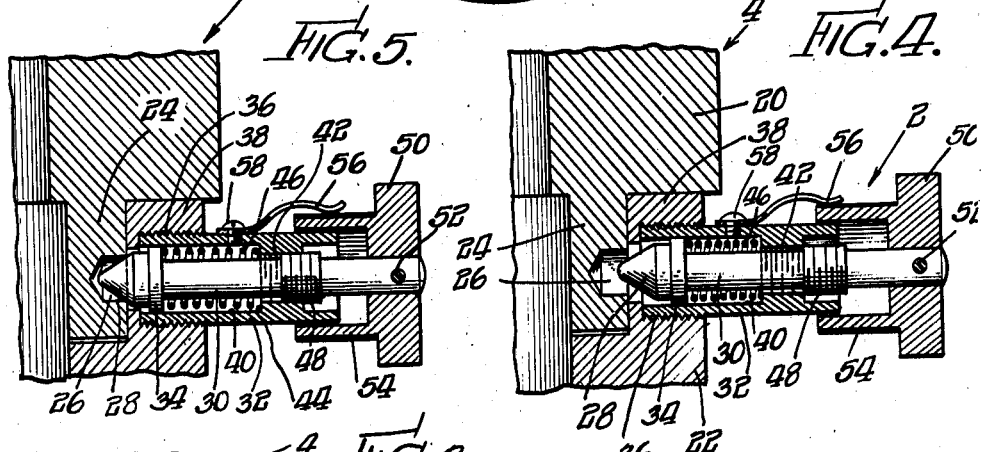
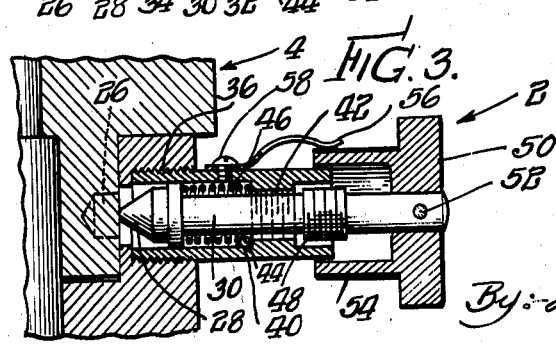
INVENTOR.
Henry R. Gross Patented May 9, 1944

2,348,292

UNITED STATES PATENT OFFICE 2,348,292

AUTOMATIC LATCHING AND LOCKING DEVICE

Henry R. Gross, Chicago, Ill.

Application April 8, 1943, Serial No. 482,253

3 Claims. (Cl. 29—49)

This invention relates to an automatic latching and locking device, and has for its principal object the provision of a device which will automatically and resiliently latch one member to another in one or more predetermined relative positions, and which may be manually operated to lock said members in one or more of said predetermined positions against any lost motion whatsoever or released to permit relative motion or detachment of one member from the other.

Other and further objects and advantages of the invention will be apparent from the following description when taken in connection with the accompanying drawing, wherein—

Figure 1 is a view in elevation of the device and of a machine in which the device may be used;

Figure 2 is a view in horizontal section taken substantially along the line 2—2 of Figure 1;

Figure 3 is an enlarged fragmentary view in vertical section taken substantially along the line 3—3 of Figure 2 but with the parts in a different position of operation; and Figures 4 and 5 are views similar to Figure 3 but showing the parts in different positions of operation.

As shown in the drawing for purposes of exemplification only, the automatic latch and locking device 2 may be employed automatically to latch the tool turret 4 of a lathe or other machine 6 in its various tool positions and lock the same in such positions upon subsequent manual operation of the device 2. The lathe 6 may comprise, for example, the conventional headstock 8 rotatably supporting the work holding chuck 10 carrying the work piece 12, upon which a successive series of machining operations is to be performed by tools 14 carried by the turret 4. The base 16 of the turret 4 may in any conventional manner be connectable to a lead screw 18 by which the turret and the tools are traversed along the bed of the machine toward and from the work piece. The turret 4 may comprise, as is conventional, a tool holding chuck 20 journaled for angular adjustment on a stepped vertical shaft 22. It is, of course, necessary that the turret head 20 in its various angular positions be precisely positioned so that each tool will be properly and precisely aligned with the work piece. For this purpose the turret head 20 may be formed with an annular flange 24 which forms one member of the automatic latching and locking device 2, this member being provided with a plurality of angularly spaced openings 26 adapted to receive the beveled end 28 of a latch member or pin 30.

The pin 30 is mounted in a tubular housing 32 in which it is slidably supported by a slide bearing formed by the enlarged cylindrical portion 34 of the pin 30. The housing 32 is externally threaded as at 36 for threading into a supporting member 38 formed by an annular upstanding flange of the base or block 16. The housing 32 may be formed with a bore 40 of a diameter conforming with the cylindrical portion 34 of the pin and a reduced bore 42 forming an annular shoulder 44 forming an abutment for one end of a helical spring 46 interposed between said shoulder and the enlarged cylindrical portion 34 of the pin. The reduced bore 42 is of a diameter somewhat greater than the external diameter of the shank portion of the pin 30 and is threaded to receive the externally threaded, enlarged cylinder portion 48 of the pin 30.

A manually operable knob 50 is fastened to the pin 30 as by a set screw or pin 52, the knob being formed with an integral sleeve 54 extending over the tubular housing 32 and externally knurled for cooperation with a retainer spring 56 fastened as by screw 58 to the housing 32 or member 38.

The openings 26 in the member 24 being properly aligned with the several tools when positioned in the turret chuck 20, it will be evident that, as a tool becomes aligned with the work piece, a corresponding opening 26 will approach alignment with the pin 30, as shown in Figure 3, whereupon, when aligned, the spring 46 causes the beveled or conical end 28 of the pin to become seated in the opening, as shown in Figure 4. The extent to which the pin projects into the opening is determined by the engagement of the threaded portion 48 of the pin with the threaded bore 42 of the housing, as indicated in Figure 4. It will be evident that the member 24 will, therefore, be resiliently latched in a predetermined position, and that it may be rotated relative to the pin or latching member 30 and the supporting member 38; since, by reason of the conical head 24, the wall of the opening will exert a camming action, forcing the pin outwardly against the action of the spring 46. It will be further evident that a certain amount of lost motion will exist between the pin and the member 24, no matter how small a tolerance exists between the head of the pin and the opening 26 when the pin is forced by the spring into the opening. This lost motion is overcome or eliminated by providing the reduced, threaded bore 42 and the externally threaded cylindrical portion 48. Thus, when the relative positions of the member 24 and supporting member 38 have been determined by the snapping of the pin into an opening 26, the knob 50 may be rotated to rotate the pin into the threaded bore 42, thus moving the pin axially and forcing the head of the pin into full seating position in the opening 26 with whatever force may be required to prevent any movement of the members 24 and 38 relative to each other and thus eliminate the lost motion. This also serves to lock the pin against axial movements, and hence secures the member 24 in fixed position. The retainer spring 56 engaging the knurled sleeve of the knob 50 serves as a latch, preventing any inadvertent rotation of the knob, due to vibration or any other cause.

It will be evident that this automatic latching and locking device may be used releasably to secure, in predetermined fixed position, two relatively movable members, or two relatively rotatable members of which one is journaled within the other, and that this device will also serve to indicate when any two such relatively movable or relatively rotatable members have reached a predetermined relative position, even though the movements or positions of the members may not be observable. This will be evident when it is noted that the snapping of the pin into its cooperating opening creates a click or sound which can be heard, in many installations, and also creates a momentary vibration which can be felt if one of the other members be a manually moved member.

Also, it is apparent that this automatic latching and locking device may be used to determine the relative position of any two such relatively movable or rotatable members, and releasably to secure such members in the determined position against movement in both of two directions. Thus, in the illustrated example, the automatic latching and locking device 2 releasably secures the members 24 and 38 not only in predetermined angular position, but also in predetermined axial position. Upon release of the threaded portion 48 from the thread of the threaded bore 42 of the housing, the member 24 may not only be rotated axially relative to the member 38 against the resilient action of the latch, but also the member 24 may be detached axially from the member 38 against the resilient latching action of the device. It is further evident that the pin 30, being in the position shown in Figure 4, an outward pull exerted on the knob against the force of the spring 46 will move the conical head of the pin entirely out of the opening 26 so that the member 24 may be freely rotated relative to, or detached axially from, the member 38.

It is thought that the invention and numerous of its attendant advantages will be understood from the foregoing illustrative description, and it is obvious that numerous changes may be made in the form, construction, and arrangement of the several parts without departing from the spirit or scope of the invention or sacrificing any of its attendant advantages, the form herein described being a preferred embodiment for the purpose of illustrating the invention.

What I claim is:

1. In a device of the character described, first and second members rotatable relative to each other about a common axis, the first of said members having a predeterminedly positioned radial opening therein, a slidable latch, the second of said members carrying a guide for said slidable latch, a first threaded part carried by said latch, said guide having a second, threaded part for cooperation with the threaded part of the latch, a spring fixed at one end relative to said second member and at the other end engaging said latch for resiliently urging said latch radially into said opening and the first threaded part into engagement with the second threaded part when the opening is radially aligned with said latch, and means for rotating said latch and said guide relative to each other for locking said latch against release.

2. In an automatic latch and locking device for locating and securing rotatable members in predetermined angular position, first and second members rotatable relative to each other about a common axis, the first member having a predeterminedly positioned radial opening therein, a latch pin, means forming a latch pin housing for slidably mounting said pin on the second of said members for movement radially of said axis, means in said housing for automatically sliding said latch pin radially of said axis into the opening of the first member when the opening is aligned with said latch pin, said latch pin housing having an internally threaded bore therein, said latch pin having a cooperating threaded part, said threaded part being moved radially into engagement with the threaded bore in said housing when the latch pin is moved into said opening by said automatic means, and means for rotating said latch pin and housing relatively to screw said part into the threaded bore to lock said pin against release.

3. In an automatic latching and locking device for locating and securing members in predetermined angular position, first and second members rotatable relative to each other about a common axis, the first member having a predeterminedly positioned radial opening therein, said second member having a radial opening therethrough in the plane of the opening in the first member when the members are brought into the desired predetermined relative angular position, and a tubular housing extending radially of the axis secured to said second member in alignment with said opening therein, a latch pin slidably mounted in said tubular housing for movement radialy of the axis, said latch pin having a beveled nose, said tubular housing having a reduced and threaded bore concentric with the axis of said pin and through which said pin extends, spring means interposed between said reduced portion of the housing and a protuberance on said pin for urging said pin radially through the opening in the second member into engagement with the defining wall of the opening in the first member when said openings are aligned, said pin having a threaded part urged radially into engagement with the threaded bore of the tubular housing by said spring means when said pin is moved into the opening in the first member, and means for rotating said latch pin and tubular housing relative to each other to force the beveled nose of the latch pin into firm engagement with the defining wall of the opening in the first member whereby to lock said members in predetermined position against any relative movement.

HENRY R. GROSS.